US011580201B2

(12) United States Patent
Adams et al.

(10) Patent No.: US 11,580,201 B2
(45) Date of Patent: Feb. 14, 2023

(54) METHOD AND APPARATUS FOR ACCESSING AUTHENTICATION CREDENTIALS WITHIN A CREDENTIAL VAULT

(71) Applicant: BlackBerry Limited, Waterloo (CA)

(72) Inventors: Neil Patrick Adams, Waterloo (CA); Mark Alex Cullum, Ottawa (CA); Nick Waterman, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/365,172

(22) Filed: Nov. 30, 2016

(65) Prior Publication Data
US 2018/0152838 A1 May 31, 2018

(51) Int. Cl.
G06F 21/31 (2013.01)
G06F 21/45 (2013.01)
H04W 12/06 (2021.01)
H04L 9/40 (2022.01)

(52) U.S. Cl.
CPC .............. G06F 21/31 (2013.01); G06F 21/45 (2013.01); H04L 63/083 (2013.01); H04L 63/0861 (2013.01); H04W 12/068 (2021.01)

(58) Field of Classification Search
CPC ... H04W 12/06; H04L 63/083; H04L 63/0861
USPC .......................................................... 726/7
See application file for complete search history.

(56) References Cited

U.S. PATENT DOCUMENTS

| 7,136,490 | B2 | 11/2006 | Martinez et al. | |
|---|---|---|---|---|
| 7,490,242 | B2 | 2/2009 | Torres et al. | |
| 7,519,987 | B1* | 4/2009 | Holt | G06F 21/31 |
| | | | | 707/999.003 |
| 8,776,214 | B1* | 7/2014 | Johansson | H04L 63/0823 |
| | | | | 713/170 |
| 8,838,071 | B1* | 9/2014 | Cronin | H04L 63/10 |
| | | | | 455/411 |
| 10,523,654 | B1* | 12/2019 | El Defrawy | H04L 63/0815 |
| 2003/0159071 | A1* | 8/2003 | Martinez | G06F 21/31 |
| | | | | 726/8 |
| 2004/0122742 | A1* | 6/2004 | Vetelainen | G06Q 30/0601 |
| | | | | 705/26.1 |
| 2007/0169174 | A1* | 7/2007 | Critten | G06F 21/34 |
| | | | | 726/3 |
| 2007/0288320 | A1* | 12/2007 | Cooper | G06Q 20/206 |
| | | | | 705/348 |
| 2011/0047606 | A1* | 2/2011 | Blomquist | G06F 21/41 |
| | | | | 726/7 |

(Continued)

OTHER PUBLICATIONS

European Patent Office, Extended European Search Report for Application No. 17203285.6, dated Jan. 15, 2018.

(Continued)

Primary Examiner — Mohammad W Reza
Assistant Examiner — Moeen Khan
(74) Attorney, Agent, or Firm — Moffat & Co

(57) ABSTRACT

A method at a computing device, the method including detecting, at the computing device, a trigger that authentication is pending for an application or service; indicating a state of a credential vault via a user interface of the computing device; and when the credential vault is in a locked state, activating an authentication mechanism for the credential vault without changing focus on the user interface for the application or service.

17 Claims, 5 Drawing Sheets

(56) References Cited

U.S. PATENT DOCUMENTS

| | | | | |
|---|---|---|---|---|
| 2012/0204245 | A1* | 8/2012 | Ting | G06F 21/35 |
| | | | | 726/6 |
| 2012/0297190 | A1 | 11/2012 | Shen et al. | |
| 2015/0039908 | A1* | 2/2015 | Lee | G06F 21/35 |
| | | | | 713/193 |
| 2015/0286813 | A1* | 10/2015 | Jakobsson | G06F 21/35 |
| | | | | 726/9 |
| 2016/0063259 | A1* | 3/2016 | Bhansali | G06F 9/4406 |
| | | | | 713/2 |
| 2016/0191499 | A1* | 6/2016 | Momchilov | H04L 63/0815 |
| | | | | 713/171 |
| 2016/0321441 | A1* | 11/2016 | Tonoyan | G06F 21/32 |
| 2016/0328700 | A1* | 11/2016 | Bortolotto | G06Q 20/386 |
| 2018/0012070 | A1* | 1/2018 | Shin | G06K 9/00604 |

OTHER PUBLICATIONS

"Android | User Manual", XP055435492, retrieved from the internet URL: <https://web.archive.org/web/20161021163543/https://helpdesk.lastpass.com/lastpass-mobile/lastpass-for-android/> [retrieved Dec. 15, 2017], dated Oct. 21, 2016.

European Patent Office, Examination Report for Application No. 17203285.6, dated Mar. 13, 2019.

European Patent Office, Communication pursuant to Article 94(3) EPC for Application No. 17203285.6, dated Oct. 31, 2019 (8 pages).

European Patent Office, Communication pursuant to Article 94(3) EPC for Application No. 17203285.6, dated Feb. 3, 2021 (10 pages).

European Patent Office, Communication pursuant to Article 94(3) EPC for Application No. 17203285.6, dated Aug. 11, 2022.

\* cited by examiner

METHOD AND APPARATUS FOR ACCESSING AUTHENTICATION CREDENTIALS WITHIN A CREDENTIAL VAULT

FIELD OF THE DISCLOSURE

The present disclosure relates to authentication credentials for unlocking features within an application or service, and in particular relates to the access to authentication credentials secured in a credential vault.

BACKGROUND

In order to access functionality within an application or service, a user will often be required to provide authentication credentials. For example, the application or service may require a username and password to be provided prior to allowing access to such application or service.

Users typically have many applications or services that they access, and each may require one or more authentication credentials. For example, a user may access online banking and require a first authentication credential, an application storefront which may require a second authentication credential, social media sites which may require further authentication credentials, among others.

In some cases, a user will reuse the same password or other authentication credential between these sites in order to allow the user to remember such credentials. However, this creates security issues and compromises the user's data if one of such applications or services is breached.

In order to overcome this, or for other reasons, users may store credentials in a credential vault. As used herein, a credential vault can comprise any digital vault that is used to store information for access to an application or a service. For example, the credential vault may store a user name and password for each application or service.

The credential vault itself is typically encrypted and requires a decryption key to access the contents stored therein. The decryption key may comprise a password, personal identification number (PIN), graphical authentication, gesture, biometric data, voice data, or may comprise data that is received from a sensor on a device, or any combination of any of the foregoing. In other cases, a card read by a card reader connected to the device may be used. Other types of sensors could also be used.

BRIEF DESCRIPTION OF THE DRAWINGS

The present disclosure will be better understood with reference to the drawings, in which.

DETAILED DESCRIPTION OF THE DRAWINGS

Figure 1:
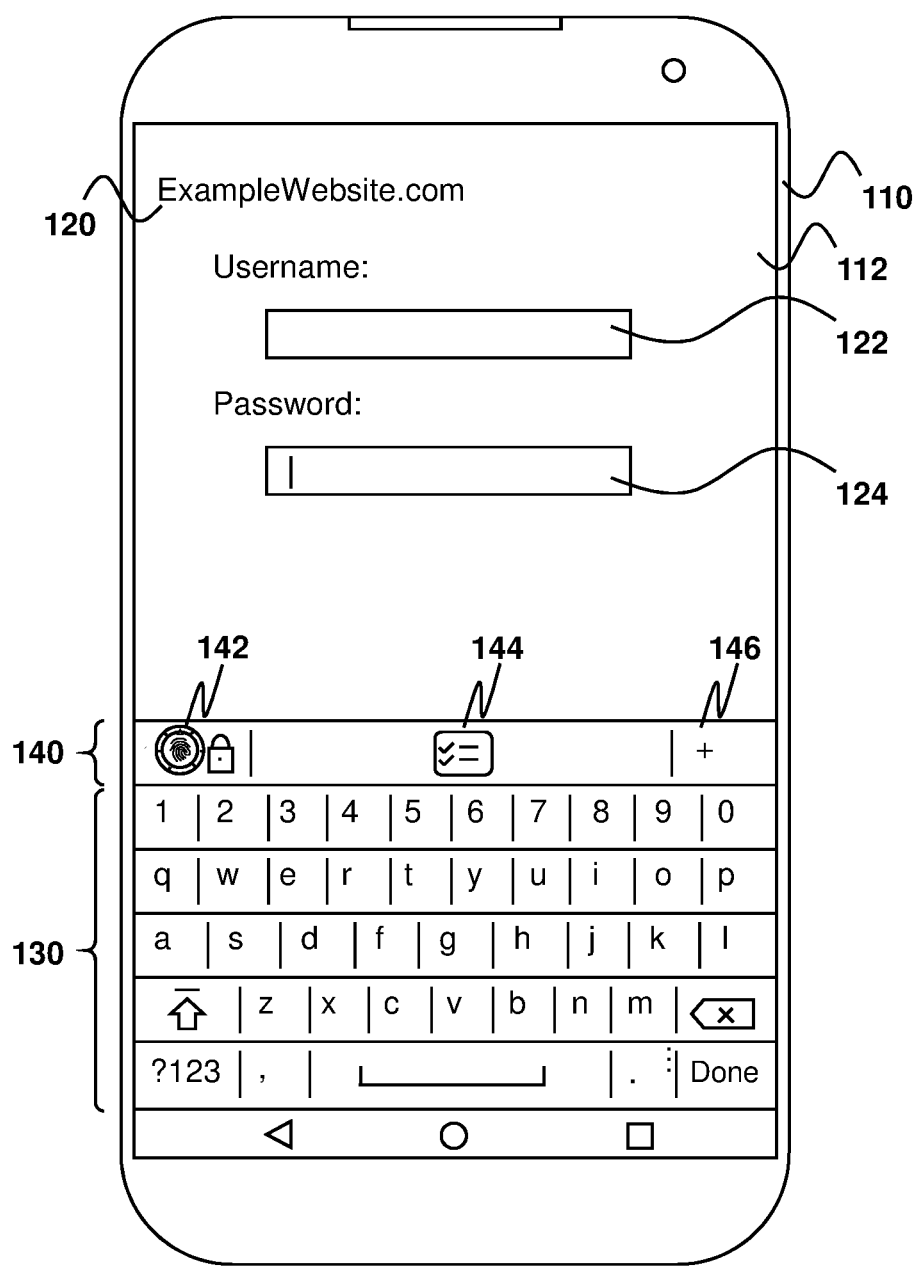
FIG. 1 is a top plan view of a computing device having an application or service displayed thereon.

The present disclosure provides a method at a computing device, the method comprising: detecting, at the computing device, a trigger that authentication is pending for an application or service; indicating a state of a credential vault via a user interface of the computing device; and when the credential vault is in a locked state, activating an authentication mechanism for the credential vault without changing focus on the user interface for the application or service.

The present disclosure further provides a computing device comprising: a processor; and a memory for storing instruction code, wherein the instruction code causes the computing device to: detect a trigger that authentication is pending for an application or service; indicate a state of a credential vault via a user interface of the computing device; and when the credential vault is in a locked state, activate an authentication mechanism for the credential vault without changing focus on the user interface for the application or service.

The present disclosure further provides a computer readable medium for storing program code for execution on a processor of a computing device, the program code comprising instructions for: detecting at the computing device, a trigger that authentication is pending for an application or service; indicating a state of a credential vault via a user interface of the computing device; and when the credential vault is in a locked state, activating an authentication mechanism for the credential vault without changing focus on the user interface for the application or service.

In many cases, when a user wants to access an application or service, the user may go to a credential vault in order to obtain the access credentials. This is especially true for applications or services that are not accessed very frequently. A credential vault can be any password manager or credential storage which is independently encrypted and locked using a key. Such key can include, for example, a password, a PIN, a gesture, voice data, biometric data read from a biometric sensor such as a fingerprint that is read by a fingerprint sensor, a tag that is read or challenged by a wireless tag proximity sensor such as a near field communication (NFC) sensor or a radio frequency identifier (RFID) sensor on the device, or a combination of any of the foregoing, among other options. For example, the device may have a fingerprint sensor and the credential used to access content within the credential vault and may comprise the fingerprint of a user. Similarly, the credential may be stored or derived on a near field communications tag or card, which may, when placed in proximity to a user device, provide credential information to the user device to allow the credential vault to be accessed.

The process to obtain information from a credential vault may be cumbersome. In order to unlock the credential vault, the user typically needs to change the focus of the display from the current application or service to the credential vault. The unlocking procedure for the credential vault must then be started, and when the credential vault is unlocked the authentication credentials for the particular application or service must be obtained.

Such process detracts from a user experience with the application or service. Further, the particular set of steps to unlock the credential vault is complicated and may lead a user to skip using such vault and instead to use weaker security such as repeated passwords between applications or services.

Therefore, in accordance with the present disclosure, the process for allowing a service or application to be unlocked is performed directly from the application or service, without needing to leave such application or service.

In accordance with the embodiments described below, the application or service is unlocked by entering a password.

However, the use of a password as the authentication credential is merely an example, and other forms of authentication credentials may equally be used.

For example, the application or service may need a fingerprint to be read, an encryption key to be utilized, or digital passcode to be used, or a combination of any of the foregoing. In this case, such information may be obtained from the credential vault rather than directly from a sensor.

When using a password for the authentication credential, the placing of the input focus on the device may cause a keyboard to be displayed within the application or service. In accordance with one embodiment of the present disclosure, the virtual keyboard may be modified to provide functionality to unlock and access the credential vault, including the display of the status of the credential vault.

In other cases, a virtual keyboard may not be required. For example, the device may comprise or be coupled to a physical keyboard, or the authentication mechanism for the application or service does not require a keyboard. Thus in some embodiments of the present disclosure, a device display may be modified to show the status of the credential vault by providing some aspects of the virtual keyboard in order to provide direct access to the credential vault from the application or service.

The embodiments of the present disclosure may be implemented on a computing device. Such computing device may comprise any fixed or portable computing device, including, but not limited to, a desktop computer, laptop computer, mobile device, smartphone, tablet, vehicular computing system, among other options. In the embodiments below the computing device is described as a mobile device for illustration purposes only.

Reference is now made to FIG. 1, which shows an example computing device 110. In accordance with the embodiment of FIG. 1, device 110 includes a display 112. In one example, display 112 comprises a touch sensitive display, thereby providing a first user interface to computing device 110.

In the example of FIG. 1, the computing device has navigated a browser to a service entitled "ExampleWebsite.com". Such service may include, for example, a banking service, social media, online retail, cloud storage, corporate website, among others. In other embodiments, a user may have launched an application either local to or remote from the computing device 110.

The application or service 120 requires authentication prior to allowing access to all or parts of the application or service. In the example of FIG. 1, the application or service 120 includes a username field 122 and a password field 124.

When the user interface focus is placed in one of these fields, for example by touching or selecting one of these fields, a keyboard 130 may be displayed on display 112. Such keyboard 130 may be utilized to enter the information in the username field 122 or password field 124 manually.

In accordance with one embodiment of the present disclosure, a credential vault user interface 140 comprising a bar is further added to the user interface. Credential vault user interface 140 can include a user interface element 142 such as an icon indicating a current status of the credential vault, a user interface element 144 such as an autofill icon to allow the username and/or password to be filled merely by pressing the icon when the credential vault is unlocked, and a user interface element 146 such as an update field which allows new records to be created in the credential vault.

The embodiment of FIG. 1 is however one example, and more or fewer icons could be displayed within the credential vault user interface 140. For example, rather than a bar 140, only user interface element 142 comprising an icon could be provided within a key of keyboard 130 in some cases.

Further, on a computing device 110 comprising or coupled to a physical keyboard, the credential bar field including credential vault icon 142 may be displayed without the remainder of keyboard 130 being displayed.

In other embodiments, user interface element 142 may be provided in a notification tray for the application, or provided as a pop-up window within the application.

The user interface element 142 that is displayed for the credential vault is determined based on a state of the credential vault. For example, in one embodiment the credential vault may use an input method engine (IME) to provide a state through the operating system of computing device 110. Keyboard 130 may watch for such state and when the keyboard is activated and a trigger indicating that authentication is required is provided, the keyboard may be enhanced with the credential vault bar 140 including the icon 142 of the appropriate state for the credential vault.

In the example of FIG. 1, the credential vault is locked, as shown by user interface element 142 which shows a locked symbol. Further, in the embodiment of FIG. 1, the credential vault indicates that it will accept a fingerprint input by utilizing a fingerprint symbol within the user interface element 142. However, other examples are possible. For example, if a near field communication tag was utilized for unlocking the credential vault, a near field communication symbol may be displayed within user interface element 142. In other embodiments, user interface element 142 may not indicate the input method but may simply leave it to the user to utilize whatever input method is typically used to unlock the credential vault. Other examples are possible and are within the scope of the present disclosure.

In accordance with various embodiments of the present disclosure, the activation of the keyboard 130 with the credential vault bar 140 may further cause a sensor on computing device 110 to be activated in order to receive an input to unlock the credential vault. In particular, in accordance with the embodiment of FIG. 1, user interface element 142 shows that the credential vault may be unlocked using a fingerprint sensor. In this regard, computing device 110 may, when the keyboard and user interface element 142 are displayed, activate the fingerprint sensor at that time. For example, the credential vault could cause the computing device to activate the fingerprint sensor based on the fact that the keyboard is up and the credential vault is locked.

Thus, a user of computing device 110 could then place a finger on the fingerprint sensor and the credential vault could be unlocked automatically without changing the focus away from the application or service 120.

Figure 2:
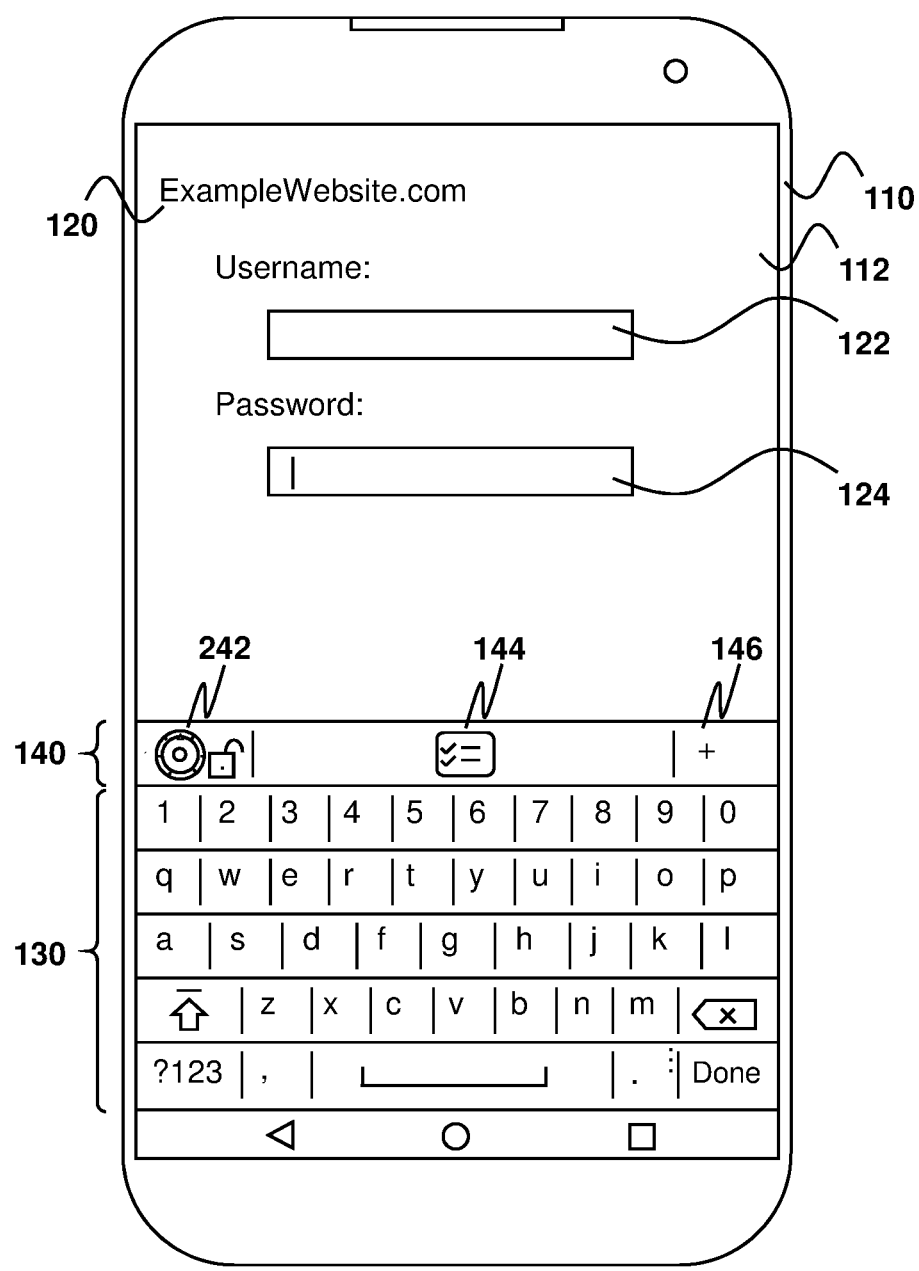
FIG. 2 is a top plan view of a computing device showing an unlocked credential vault icon.

Reference is now made to FIG. 2. In the example of FIG. 2, the computing device 110 has detected a fingerprint on a fingerprint sensor and the credential vault has been unlocked. This is shown by user interface element 242, which comprises an icon and shows an unlocked symbol for the credential vault.

Once the credential vault is unlocked then the authentication that is pending for the application or service may be completed. For example, in one embodiment a user may use user interface element 144 to allow the credential vault to fill in the one or both of the user name and/or password fields for the application or service 120. This would be done by having the credential vault look up the application or service and provide the information through the interface.

In an alternative embodiment, the unlocking of credential vault 242 may provide an indication that the authentication parameters should be provided to the application or service 120 automatically. In this case, detecting a fingerprint on the fingerprint sensor may cause both the credential vault to unlock and the filling of the information on the application or service.

In the above examples, control remains with the credential vault. Thus the verification of either the password, fingerprint, NFC reader or other input mechanism for the authentication to the credential vault is done within the credential vault itself. Therefore, the security of the credential vault is not compromised.

Further, the state of user interface element 142 or 242 is provided by the credential vault, either directly to the keyboard service, application or service, or by utilizing the operating system of computing device 110. For example, mechanisms may exist within the operating system to provide state information, and the changing of the state that is being monitored by an application or service may cause a trigger to the application or service.

In still further examples, instead of a password field for the service or application, a challenge-response mechanism may be utilized. In this case, the credential vault may include software to analyze the challenge and provide the appropriate response. Here, the activation of the challenge-response mechanism within the application or service 120 may further activate a credential vault bar 140 or element 142, allowing the credential vault to be unlocked without changing focus from the application or service 120.

In the case that the authentication mechanism for unlocking the credential vault is unsuccessful, various inputs or feedback may be provided to the user. For example, if the user is to use a fingerprint scanner to unlock the credential vault and the fingerprint scan is unsuccessful, an icon displaying an unsuccessful authentication may be provided to the user. In other cases, a pop up window, an audible signal, or any visual, audible or tactile indicator may indicate that the authentication was unsuccessful.

Figure 3:
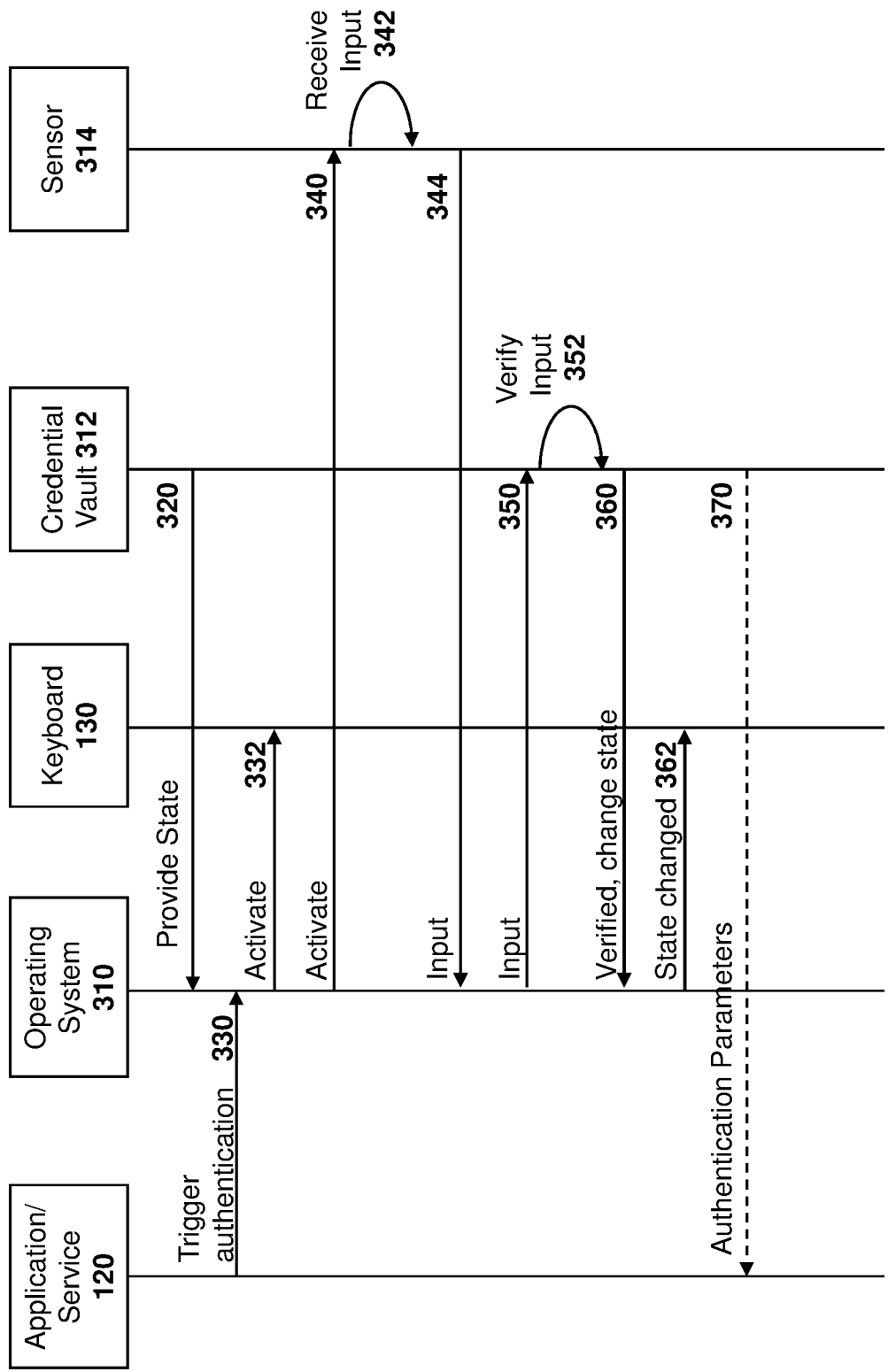
FIG. 3 is a data flow diagram showing one embodiment for providing authentication credentials to an application or service.

Reference is now made to FIG. 3, which shows a dataflow diagram with the various elements described above. The embodiment of FIG. 3 is merely one example of the implementation of the methods and systems described herein.

In particular, in the example of FIG. 3, an application or service 120 interacts through an operating system 310 of computing device 110. Operating system 310 can be any computing device operating system including, but not limited to, Android™, iOS™, BlackBerry™ OS, Windows™, Linux, MacOS™ among others.

Further, a keyboard service 130 may be utilized by operating system 310 to provide for input on a touch screen if such service is required.

The embodiment of FIG. 3 includes a credential vault 312 along with an authentication sensor 314. Authentication sensor 314, as described above, can comprise any one or more of the following: a fingerprint reader, near field communication sensor, a card reader, a retinal or iris scanner, a camera, among other options.

In the embodiment of FIG. 3, a credential vault 312 may update the operating system 310 by providing a state for the credential vault. This is shown, for example, with message 320. Updating may be performed, for example using an interface between the keyboard service and the credential vault, or by using the operating system to hold state information, among other options.

At some later point, application or service 120 triggers an authentication requirement, as shown by message 330 to operating system 310 of computing device. As indicated above, the authentication trigger 330 may include placing the focus of the user interface into a password field, or may be another authentication trigger as described above.

The computing device 110, using the operating system 310, may activate a keyboard 130 using message 332. In this case, the activation may include the credential vault icon that corresponds with the state provided previously in message 320.

Further, operating system 310 may be used determine whether the credential vault is locked, and if yes, it may activate a sensor 314, as shown by message 340. For example, the credential vault may ask the operating system to activate the sensor in one embodiment. In another embodiment credential vault may store its state in a location that can be accessed by applications through the operating system. Other options are possible and are within the scope of the present disclosure. The activation of the sensor 314 allows for the authentication input for the credential vault without changing the focus away from the application or service 120.

Sensor 314, in the example of FIG. 3, receives an input, as shown at arrow 342, and provides the input back through operating system 310 as shown by message 344.

The input is then provided to credential vault 312 for verification, as shown by message 350. Verification of the input is performed at the credential vault, as shown by arrow 352. In other embodiments, verification may be done in various ways. For example, the operating system may verify the fingerprint and provide the verification to the credential vault, and in doing so may unlock a key which the credential vault can now access. That key is used to access an encrypted database for a user. For example, the key may be used to decrypt a file stored by the credential vault which reveals a master password for a user, which is used to decrypt the database.

In the example of FIG. 3, the authentication parameter is valid and therefore the input is verified. The credential vault 312 then sends a message back through operating system 310 to indicate that the authentication is verified and the state of the credential vault has changed from locked to unlocked. This is shown in the example of FIG. 3 with message 360.

The keyboard or credential vault bar may receive the notification that the state has change and the icon on the display may therefore be updated, as shown by message 362.

Optionally, on verification, credential vault 312 may further provide authentication parameters back to application or service 120, as shown by message 370.

In other embodiments, the pressing of an icon on keyboard 130 may trigger the authentication parameters 370 to be provided to application or service 120.

Thus, in accordance with the above, the credential vault may store authentication credentials for an application or service, where the vault may be unlocked within the application or service itself. However, control of the unlock process remains within the credential vault, thereby maintaining the security of the credential vault.

The modules and devices described above may be any computing device. One simplified block diagram of a computing device is shown with regard to FIG. 4.

Figure 4:
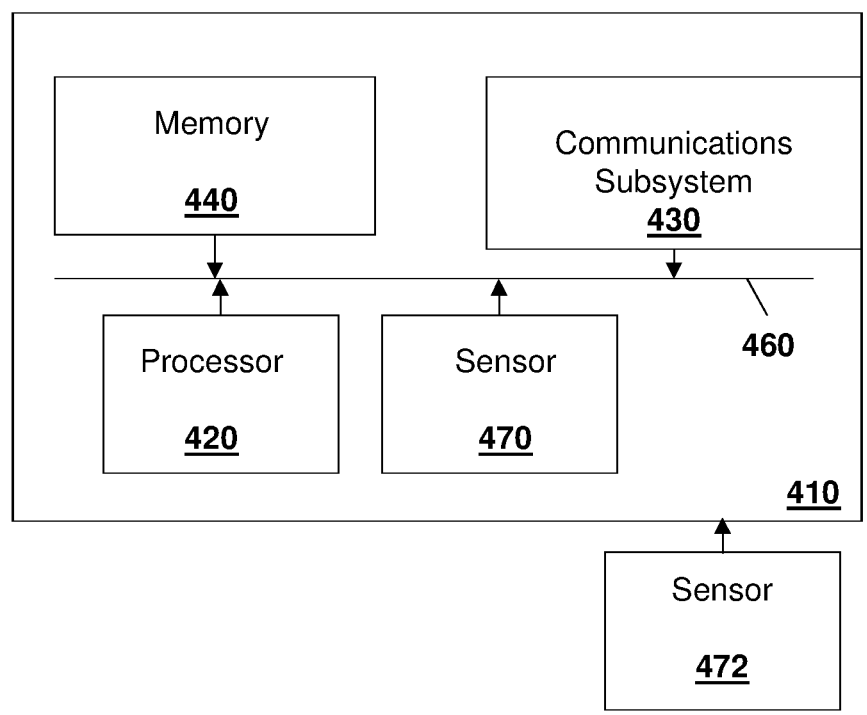
FIG. 4 is a block diagram of a simplified electronic device capable of being used with the methods and systems herein according to one embodiment.

In FIG. 4, device 410 includes a processor 420 and a communications subsystem 430, where the processor 420 and communications subsystem 430 cooperate to perform the methods of the embodiments described above.

Processor 420 is configured to execute programmable logic, which may be stored, along with data, on device 410, and shown in the example of FIG. 4 as memory 440. Memory 440 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 440, device 410 may access data or programmable logic from an external storage medium, for example through communications subsystem 430.

Communications subsystem 430 allows device 410 to communicate with other devices or network elements.

Communications between the various elements of device 410 may be through an internal bus 460 in one embodiment. However, other forms of communication are possible and are within the scope of the present disclosure.

If a sensor is used to gain access to a credential vault, the sensor may be an internal sensor 470 communicating through internal bus 460 or may be an external sensor 472 that connects to computing device 410 through any wired or wireless mechanism.

Further, if computing device 110 comprises a mobile device, one example device is described below with regard to FIG. 5.

Mobile device 500 may comprise a two-way wireless communication device having voice and data communication capabilities. Mobile device 500 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment, a smartphone, a tablet, a laptop, a notebook, or a data communication device, as non-limiting examples.

Where mobile device 500 is enabled for two-way communication, it may incorporate a communication subsystem 511, including a receiver 512 and a transmitter 514, as well as associated components such as one or more antenna elements 516 and 518, local oscillators (LOs) 513, and a processing module such as a digital signal processor (DSP) 520. As will be apparent to those skilled in the field of communications, the particular design of the communication subsystem 511 will be dependent upon the communication network in which the device is intended to operate.

Network access requirements will also vary depending upon the type of network 519. In some networks network access is associated with a subscriber or user of mobile device 500. A mobile device may require a removable user identity module (RUIM) or a subscriber identity module (SIM) card in order to operate on a network. The SIM/RUIM interface 544 is normally similar to a card-slot into which a SIM/RUIM card can be inserted and ejected. The SIM/RUIM card can have memory and hold many key configurations 551, and other information 553 such as identification, and subscriber related information. Without a SIM card, the mobile device may still be capable of limited functionality, including placing an emergency call.

When required network registration or activation procedures have been completed, mobile device 500 may send and receive communication signals over the network 519. As illustrated in FIG. 5, network 519 can include multiple base stations communicating with the mobile device.

Signals received by antenna 516 through communication network 519 are input to receiver 512, which may perform such common receiver functions as signal amplification, frequency down conversion, filtering, channel selection and the like. Analog to digital (A/D) conversion of a received signal allows more complex communication functions such as demodulation and decoding to be performed in the DSP 520. In a similar manner, signals to be transmitted are processed, including modulation and encoding for example, by DSP 520 and input to transmitter 514 for digital to analog (D/A) conversion, frequency up conversion, filtering, amplification and transmission over the communication network 519 via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Mobile device 500 generally includes a processor 538 which controls the overall operation of the device. Communication functions, including data and optionally voice communications, are performed through communication subsystem 511. Processor 538 also interacts with further device subsystems such as the display 522, flash memory 524, random access memory (RAM) 526, auxiliary input/output (I/O) subsystems 528, serial port 530, one or more keyboards or keypads 532, speaker 534, microphone 536, other communication subsystem 540 such as a short-range communications subsystem and any other device subsystems, such as sensors, generally designated as 542. Serial port 530 may include a USB port or other port known to those in the art.

Figure 5:
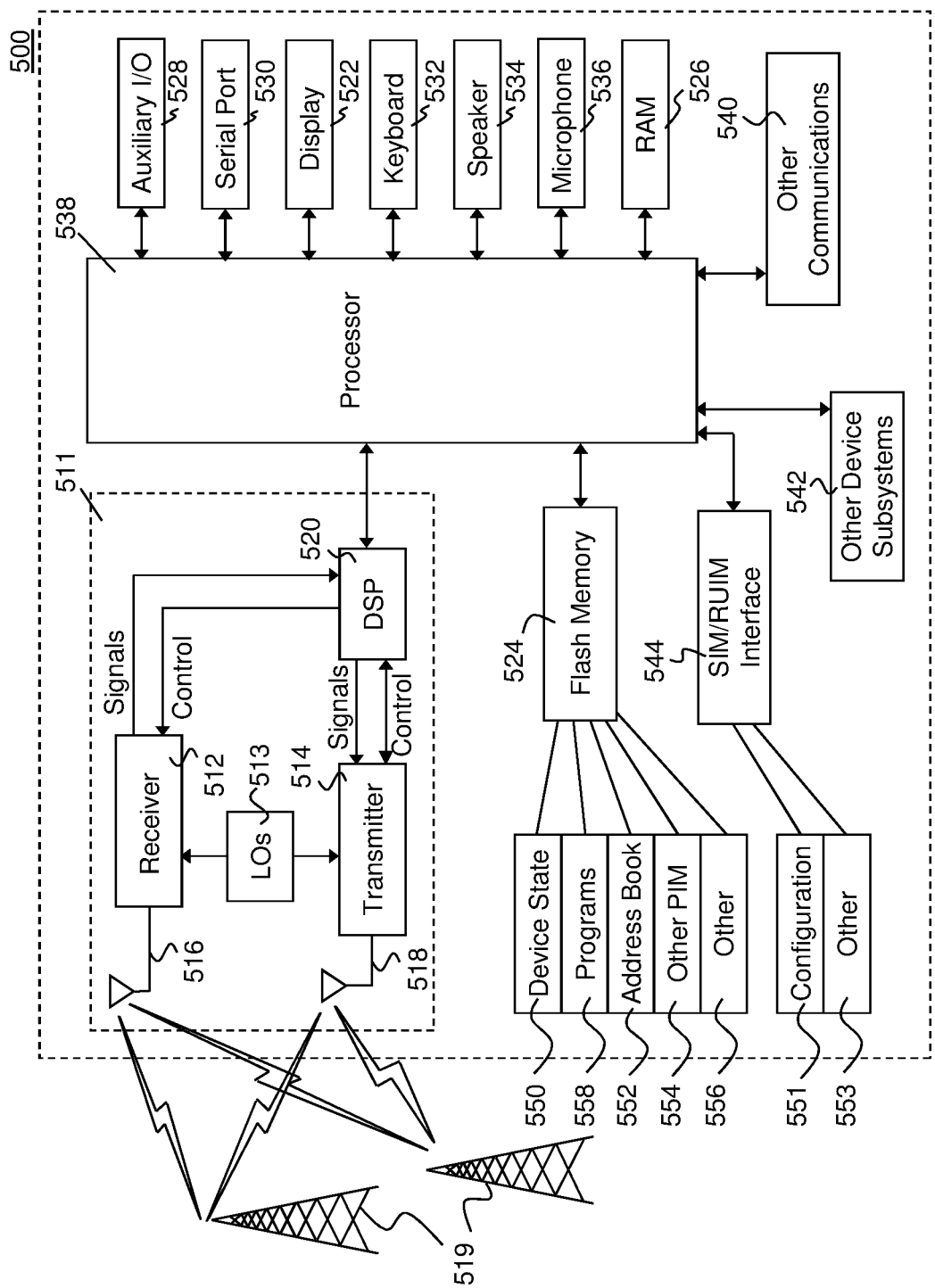
FIG. 5 is a block diagram of a mobile device according to one embodiment.

Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list.

Operating system software used by the processor 538 may be stored in a persistent store such as flash memory 524, which may instead be a read-only memory (ROM) or similar storage element (not shown). Those skilled in the art will appreciate that the operating system, specific device applications, or parts thereof, may be temporarily loaded into a volatile memory such as RAM 526. Received communication signals may also be stored in RAM 526.

As shown, flash memory 524 can be segregated into different areas for both computer programs 558 and program data storage 550, 552, 554 and 556. These different storage types indicate that each program can allocate a portion of flash memory 524 for their own data storage requirements. On such program data storage may include a credential vault.

Processor 538, in addition to its operating system functions, may enable execution of software applications on the mobile device. A predetermined set of applications that control basic operations, including at least data and voice communication applications for example, will normally be installed on mobile device 500 during manufacturing. Other applications could be installed subsequently or dynamically.

Applications and software may be stored on any computer readable storage medium. The computer readable storage medium may be a tangible or intransitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Further applications, including productivity applications, social media applications, games, among others, may also be loaded onto the mobile device 500 through the network 519, an auxiliary I/O subsystem 528, serial port 530, short-range communications subsystem or any other suitable subsystem 542, and installed by a user in the RAM 526 or a non-volatile store (not shown) for execution by the processor 538. Such flexibility in application installation increases the functionality of the device and may provide enhanced on-device functions, communication-related functions, or both.

In a data communication mode, a received signal such as a text message or web page download will be processed by the communication subsystem 511 and input to the processor 538, which may further process the received signal for output to the display 522, or alternatively to an auxiliary I/O device 528.

A user of mobile device 500 may also compose data items such as email messages for example, using the keyboard 532, which may be a complete alphanumeric keyboard or telephone-type keypad, either physical or virtual, among others, in conjunction with the display 522 and possibly an auxiliary I/O device 528. Such composed items may then be transmitted over a communication network through the communication subsystem 511.

For voice communications which are optional, overall operation of mobile device 500 is similar, except that received signals may typically be output to a speaker 534 and signals for transmission may be generated by a microphone 536. Alternative voice or audio I/O subsystems, such as a voice message recording subsystem, may also be implemented on mobile device 500. Although voice or audio signal output is preferably accomplished primarily through the speaker 534, display 522 may also be used to provide an indication of the identity of a calling party, the duration of a voice call, or other voice call related information for example.

Serial port 530 in FIG. 5 may be implemented in a mobile device for which synchronization with a user's desktop computer (not shown) may be desirable, but is an optional device component. Such a port 530 may enable a user to set preferences through an external device or software application and may extend the capabilities of mobile device 500 by providing for information or software downloads to mobile device 500 other than through a wireless communication network. As will be appreciated by those skilled in the art, serial port 530 can further be used to connect the mobile device to a computer to act as a modem or for charging a battery on the mobile device.

Other communications subsystems 540, such as a short-range communications subsystem, is a further optional component which may provide for communication between mobile device 500 and different systems or devices, which need not necessarily be similar devices. For example, the subsystem 540 may include an infrared device and associated circuits and components or a Bluetooth™ communication module to provide for communication with similarly enabled systems and devices. Subsystem 540 may further include non-cellular communications such as WiFi or WiMAX, or near field communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a computing device, the method comprising:
    detecting, at the computing device, a trigger that authentication is pending for an application or service, wherein the trigger comprises placing input focus on a user interface of the computing device into a password entry area;
    determining, by operating system of the computing device a state of a credential vault, wherein the application or service is distinct from the credential vault;
    displaying, on a user interface of the computing device, an icon indicating the state of the credential vault;
    when the credential vault is in a locked state,
        upon detecting the trigger, activating, by the operating system of the computing device, an authentication mechanism on the computing device for the credential vault without changing focus on the user interface for the application or service;
        displaying, on the user interface, at least one icon indicating a type of the authentication mechanism;
        receiving, by the operating system of the computing device input corresponding to the type of authentication mechanism to unlock the credential vault;
        verifying, at the credential vault, that the authentication mechanism produced a successful authentication;
        sending, by the credential vault to the operating system of the computing device, a message indicating successful authentication when the authentication mechanism produced the successful authentication;
        unlocking the credential vault in response to successful authentication of the authentication mechanism without changing the focus on the user interface for the application or service; and
        updating the icon to show the credential vault is in an unlocked state.

2. The method of claim 1, wherein the credential vault stores a password for the application or service.

3. The method of claim 1, wherein the credential vault stores a key to enable or launch the application or service.

4. The method of claim 1, wherein the trigger includes starting an authentication process for the application or service.

5. The method of claim 1, wherein the authentication mechanism comprises a biometric sensor.

6. The method of claim 1, wherein the authentication mechanism comprises a wireless tag proximity sensor.

7. The method of claim 1, wherein the authentication mechanism comprises a camera.

8. The method of claim 1, wherein verification of input from the authentication mechanism is done within the credential vault.

9. A computing device comprising:
    a processor; and
    a memory for storing instruction code,
    wherein the instruction code causes the computing device to:
        detect a trigger that authentication is pending for an application or service, wherein the trigger comprises placing input focus on a user interface of the computing device into a password entry area;
        determine, by operating system of the computing device a state of a credential vault, wherein the application or service is distinct from the credential vault;

display, on a user interface of the computing device, an icon indicating the state of the credential vault;

when the credential vault is in a locked state,
upon detecting the trigger, activate, by the operating system of the computing device, an authentication mechanism on the computing device for the credential vault without changing focus on the user interface for the application or service;
display, on the user interface, at least one icon indicating a type of the authentication mechanism;
receive, by the operating system of the computing device input corresponding to the type of authentication mechanism to unlock the credential vault;
verify, at the credential vault, that the authentication mechanism produced a successful authentication;
send, by the credential vault to the operating system of the computing device, a message indicating successful authentication when the authentication mechanism produced the successful authentication;
unlock the credential vault in response to successful authentication of the authentication mechanism without changing the focus on the user interface for the application or service; and
update the icon to show the credential vault is in an unlocked state.

10. The computing device of claim 9, wherein the credential vault stores a password for the application or service.

11. The computing device of claim 9, wherein the credential vault stores a key to enable or launch the application or service.

12. The computing device of claim 9, wherein the trigger includes starting an authentication process for the application or service.

13. The computing device of claim 9, wherein the authentication mechanism comprises a biometric sensor.

14. The computing device of claim 9, wherein the authentication mechanism comprises a wireless tag proximity sensor.

15. The computing device of claim 9, wherein the authentication mechanism comprises a camera.

16. The computing device of claim 9, wherein verification of input from the authentication mechanism is done within the credential vault.

17. A non-transitory computer readable medium for storing program code for execution on a processor of a computing device, the program code comprising instructions for:
detecting, at the computing device, a trigger that authentication is pending for an application or service, wherein the trigger comprises placing input focus on a user interface of the computing device into a password entry area;
determining, by operating system of the computing device a state of a credential vault, wherein the application or service is distinct from the credential vault;
displaying, on a user interface of the computing device, an icon indicating the state of the credential vault;
when the credential vault is in a locked state,
upon detecting the trigger, activating, by the operating system of the computing device, an authentication mechanism on the computing device for the credential vault without changing focus on the user interface for the application or service;
displaying, on the user interface, at least one icon indicating a type of the authentication mechanism;
receiving, by the operating system of the computing device input corresponding to the type of authentication mechanism to unlock the credential vault;
verifying, at the credential vault, that the authentication mechanism produced a successful authentication;
sending, by the credential vault to the operating system of the computing device, a message indicating successful authentication when the authentication mechanism produced the successful authentication;
unlocking the credential vault in response to successful authentication of the authentication mechanism without changing the focus on the user interface for the application or service; and
updating the icon to show the credential vault is in an unlocked state.

\* \* \* \* \*